(12) United States Patent
Swinger et al.

(10) Patent No.: US 6,173,835 B1
(45) Date of Patent: Jan. 16, 2001

(54) LAPTOP CARRYING CASE

(75) Inventors: Jay W. Swinger, 4908 Brookside 12, Kansas City, MO (US) 64112; David M. McGraw, Independence, MO (US)

(73) Assignee: Jay W. Swinger, Kansas City, MO (US)

(*) Notice: Under 35 U.S.C. 154(b), the term of this patent shall be extended for 0 days.

(21) Appl. No.: 09/332,337

(22) Filed: Jun. 14, 1999

(51) Int. Cl.⁷ ............................ B65B 85/00; A45C 13/02
(52) U.S. Cl. ........................ 206/320; 190/11; 190/102
(58) Field of Search ........................ 190/9–11, 18 A, 190/102, 900–902; 206/320

(56) References Cited

U.S. PATENT DOCUMENTS

| | | | |
|---|---|---|---|
| 2,585,209 | * 2/1952 | Abbott | 190/11 |
| 2,808,680 | * 10/1957 | Bereth | 190/11 |
| 4,132,295 | * 1/1979 | Hoehfelsen | 190/102 |
| 4,595,086 | 6/1986 | Simpson . | |
| 4,852,498 | 8/1989 | Judd . | |
| 5,153,561 | * 10/1992 | Johnson | 190/101 X |
| 5,379,893 | * 1/1995 | Ruiz | 206/320 |
| 5,388,530 | 2/1995 | Jacobus . | |
| 5,445,266 | * 8/1995 | Prete et al. | 206/320 |
| 5,623,869 | 4/1997 | Moss et al. . | |
| 5,647,484 | * 7/1997 | Fleming | 206/320 X |
| 5,713,466 | * 2/1998 | Tajima | 206/320 |
| 5,732,910 | 3/1998 | Martin . | |
| 5,762,250 | 6/1998 | Carlton et al. . | |
| 5,826,770 | * 10/1998 | Chuang | 190/11 X |
| 5,908,147 | * 6/1999 | Chueng | 190/11 X |

\* cited by examiner

Primary Examiner—Bryon P. Gehman
(74) Attorney, Agent, or Firm—Kyle L. Elliott; Blackwell Sanders Peper Martin

(57) ABSTRACT

A laptop carrying case (20) is disclosed as including a pair of sides (22, 24) and a carriage assembly (28). The sides (22, 24) are connected together by a hinge (26) and are configured to enclose a laptop computer (144) and the carriage assembly (28) in a closed position. The carriage assembly (28) is configured for retaining the laptop (144) and for sliding the laptop (144) between a carry position and a work position.

17 Claims, 8 Drawing Sheets

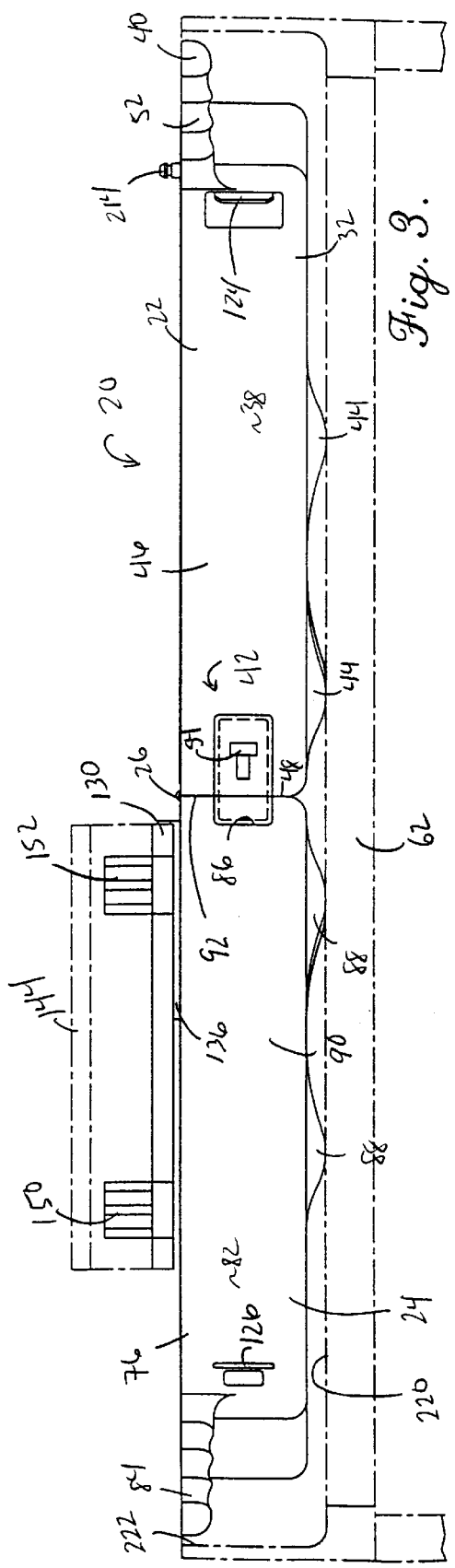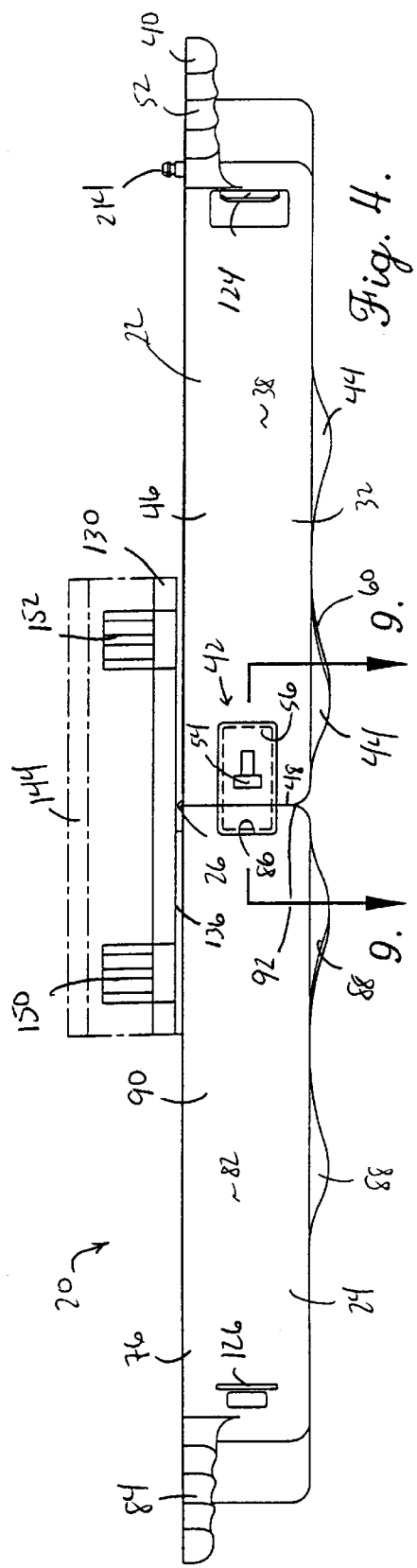

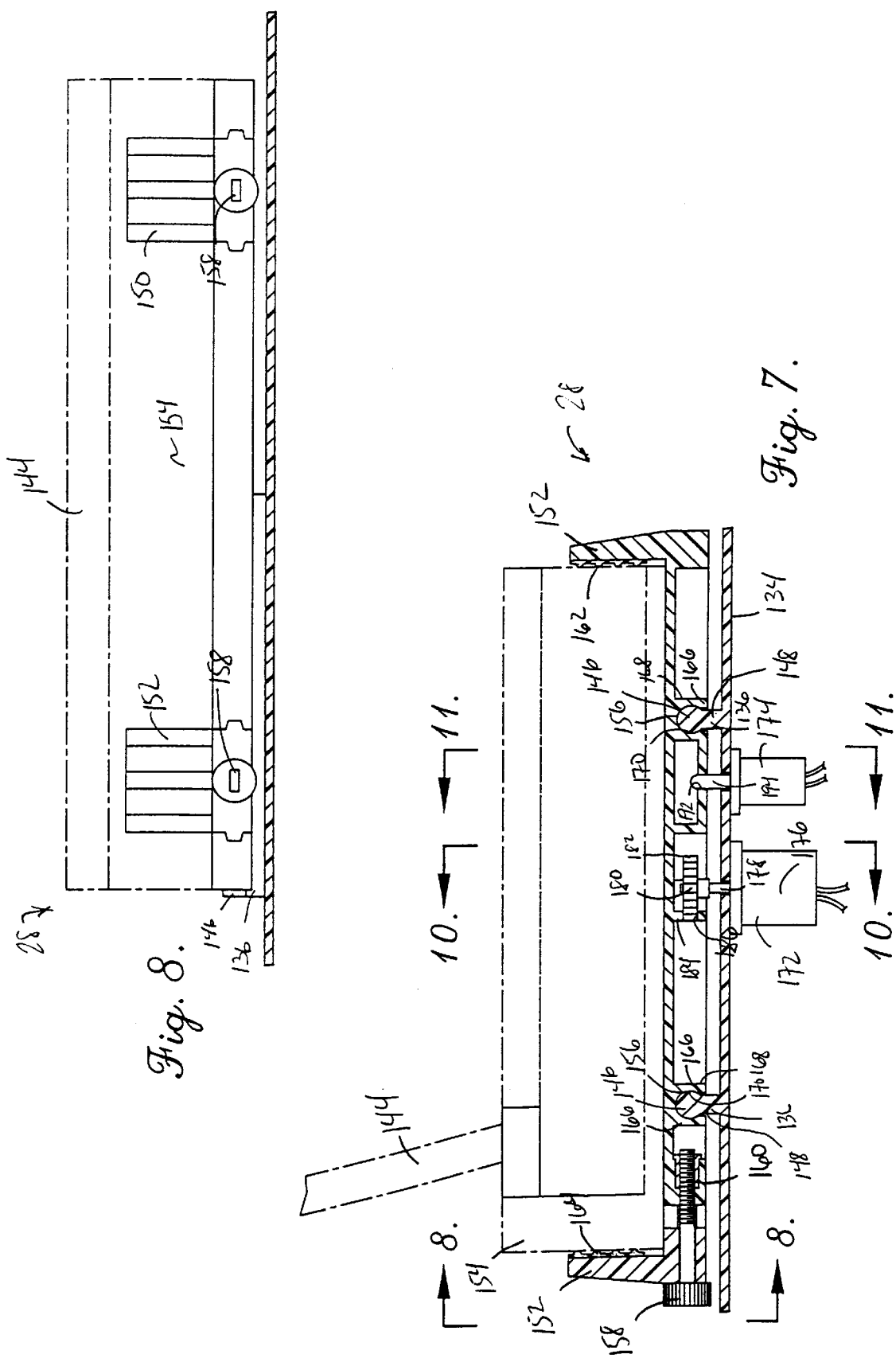

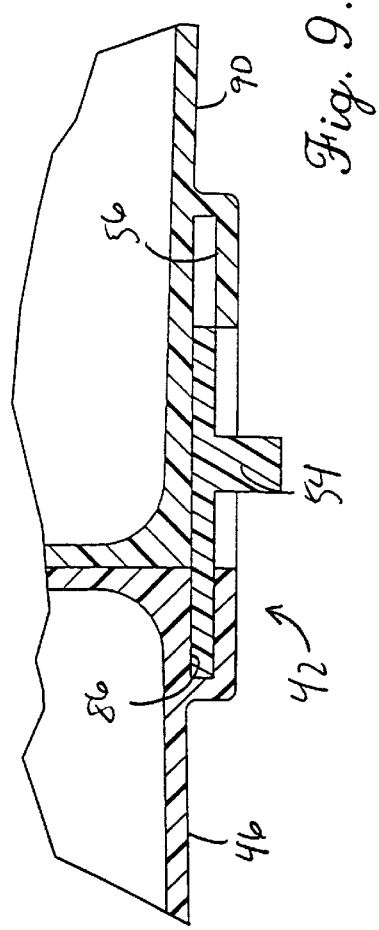
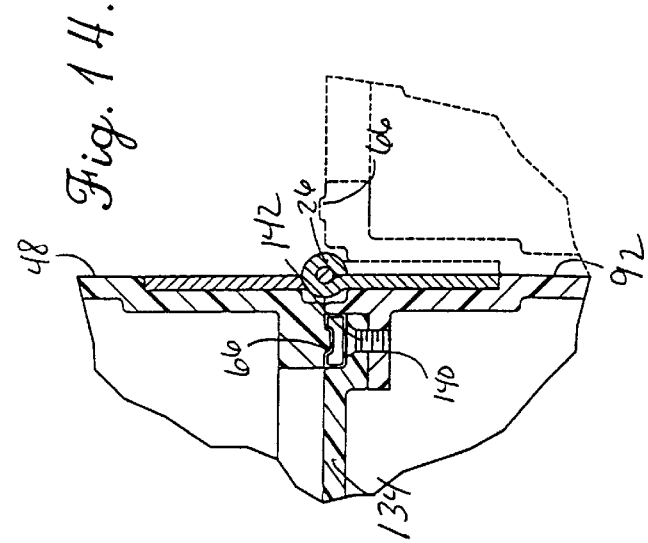
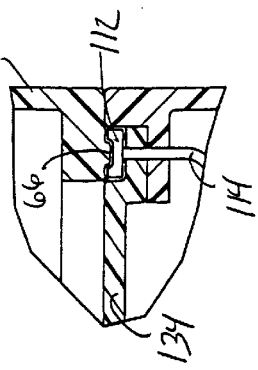
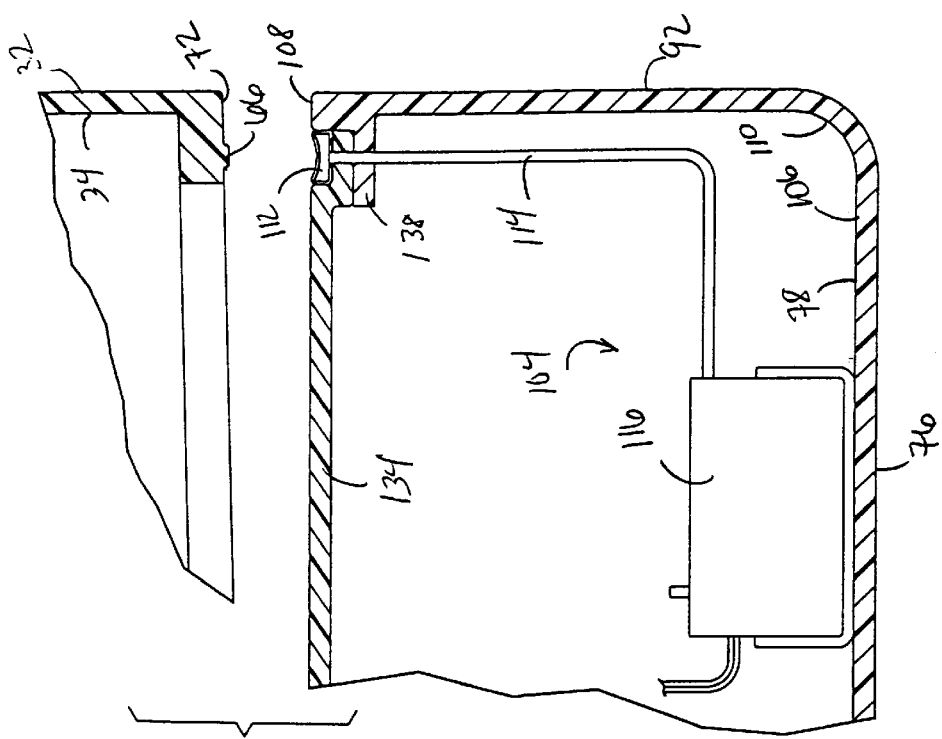

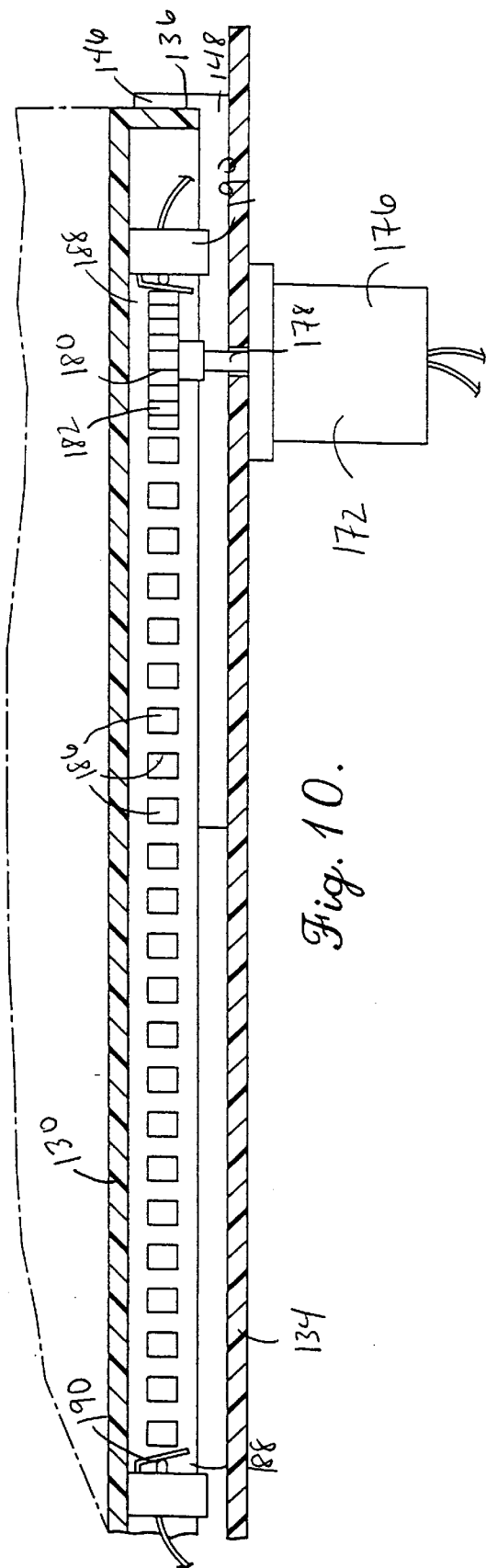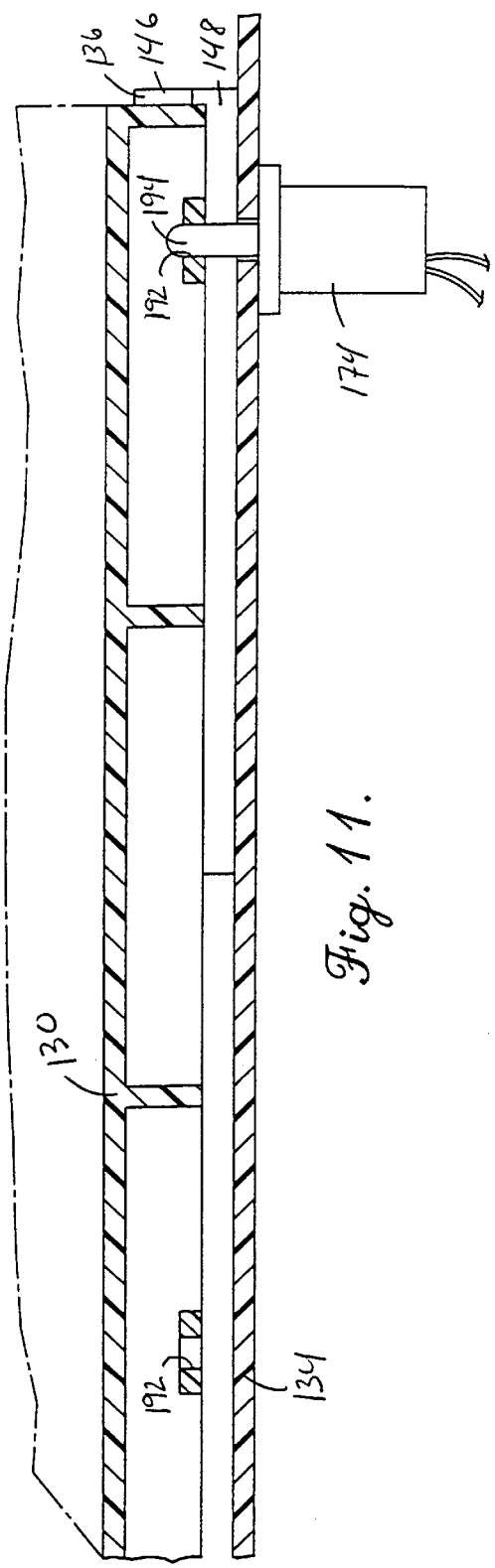

LAPTOP CARRYING CASE

BACKGROUND OF THE INVENTION

1. Field of the Invention

This invention relates to the field of computer cases. More particularly, the invention is concerned with a laptop carrying case which can be folded between a carry position and a desk position.

2. Description of the Prior Art

Computers have rapidly become a necessity. As people travel away from home they are required to use computers in places that do not promote efficiency. Laptop computers make for easier travel with a computer, but without a desk on which to set the laptop, efficient use is difficult. Since desks are not available everywhere people have to work on their computers, there has developed a need for a laptop carrying case which can function as a desk.

SUMMARY OF THE INVENTION

The present invention solves the problems mentioned above and provides a distinct advance in the state of the art. In particular, the laptop carrying case hereof allows a person to carry a laptop computer when closed and functions like a desk when opened.

The laptop carrying case assembly of the present invention broadly includes a carriage assembly and at least two sides that are connected to each other and can be folded between an open position and a closed position. The carriage assembly is connected to at least one of the sides. The carriage assembly is configured to retain the laptop and move the laptop between a carry position and a work position while the case is in the open position.

In preferred forms, the laptop carrying case assembly includes a locking mechanism for preventing an unauthorized person from gaining access to the laptop. The carriage assembly preferably includes a pair of tracks for sliding the laptop between the carry position and the work position. The sides are preferably connected by a hinge and preferably include a gasket that extends around a perimeter of the sides to form a waterproof seal.

BRIEF DESCRIPTION OF THE DRAWINGS

FIG. 3 is a side view of the laptop carrying case of FIG. 1 with the carriage shown in the carry position;

FIG. 4 is a side view of the laptop carrying case of FIG. 1 with the carriage shown in the work position;

FIG. 7 is a sectional view of the laptop carrying case of FIG. 1 taken along line 7—7 of FIG. 5;

FIG. 8 is a sectional view of the laptop carrying case of FIG. 1 taken along line 8—8 of FIG. 7;

FIG. 9 is a sectional view of a slide lock taken along line 9—9 of FIG. 4;

FIG. 10 is a sectional view of the carriage assembly taken along line 10—10 of FIG. 7;

FIG. 11 is a sectional view of the carriage assembly taken along line 11—11 of FIG. 7;

FIG. 12 is a sectional view of the laptop carrying case of FIG. 1 taken along line 12—12 of FIG. 5;

FIG. 13 is a fragmentary view of the sectional view taken along line 12—12 of FIG. 5;

FIG. 14 is a sectional view taken along line 14—14 of FIG. 5; and

DETAILED DESCRIPTION OF THE PREFERRED EMBODIMENTS

Figures 1, 15:
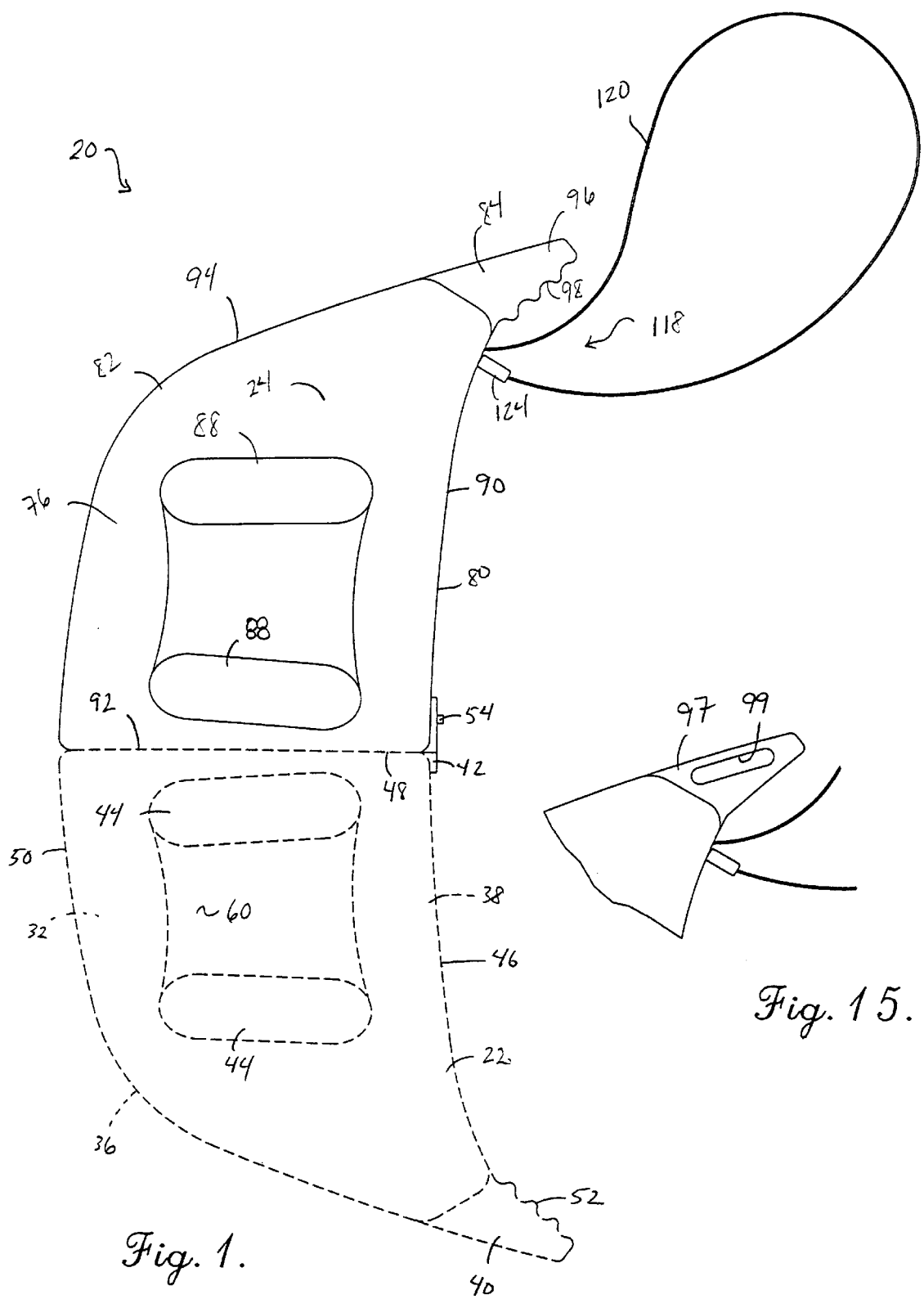
FIG. 1 is a front view of an assembled laptop carrying case in accordance with the present invention with broken lines showing the case in its open position.
FIG. 15 is a fragmentary front view of a second embodiment of the present invention, wherein the handle has an open slot.

The drawing figures illustrate a preferred laptop carrying case assembly 20 constructed in accordance with the present invention. As shown in FIGS. 1 through 6, the laptop carrying case assembly 20 generally comprises a first side 22, a second side 24, a hinge 26, a carriage assembly 28 and accessories 30.

The first side 22 includes an outer surface 32, an inner surface 34, and a perimeter 36. The outer surface 32 includes a first outer wall 38, a first handle portion 40, a slide lock assembly 42, and support members 44. The first outer wall 38 includes a concavely curved back section 46, a generally planer base section 48, and a convexly curved front section 50 which curves toward the base section and has a higher overall degree of curvature than the base section. The first handle portion 40 is located at the junction of the front 50 and back sections 46. The first handle portion 40 is preferably designed to extend from the intersection of front 50 and back sections 46 at an angle of approximately 45° relation to the base section 48, causing the case 20 to resemble a shark's dorsal fin while in a closed position. The first handle portion 40 has a grip 52 that is configured to generally fit a user's hand, similar to a pistol grip, although any type of handle could be used to allow the user to tote the carrying case.

The slide lock assembly 42, as shown in FIGS. 3, 4, and 9, includes a slide bar 54, and a first slide bar receiving slot 56 formed in the back section 46 of the first outer wall 38. The slide lock assembly 42 is located at the junction of the back 46 and base 48 sections. The operation of the slide lock assembly 42 is described below.

Figure 2:
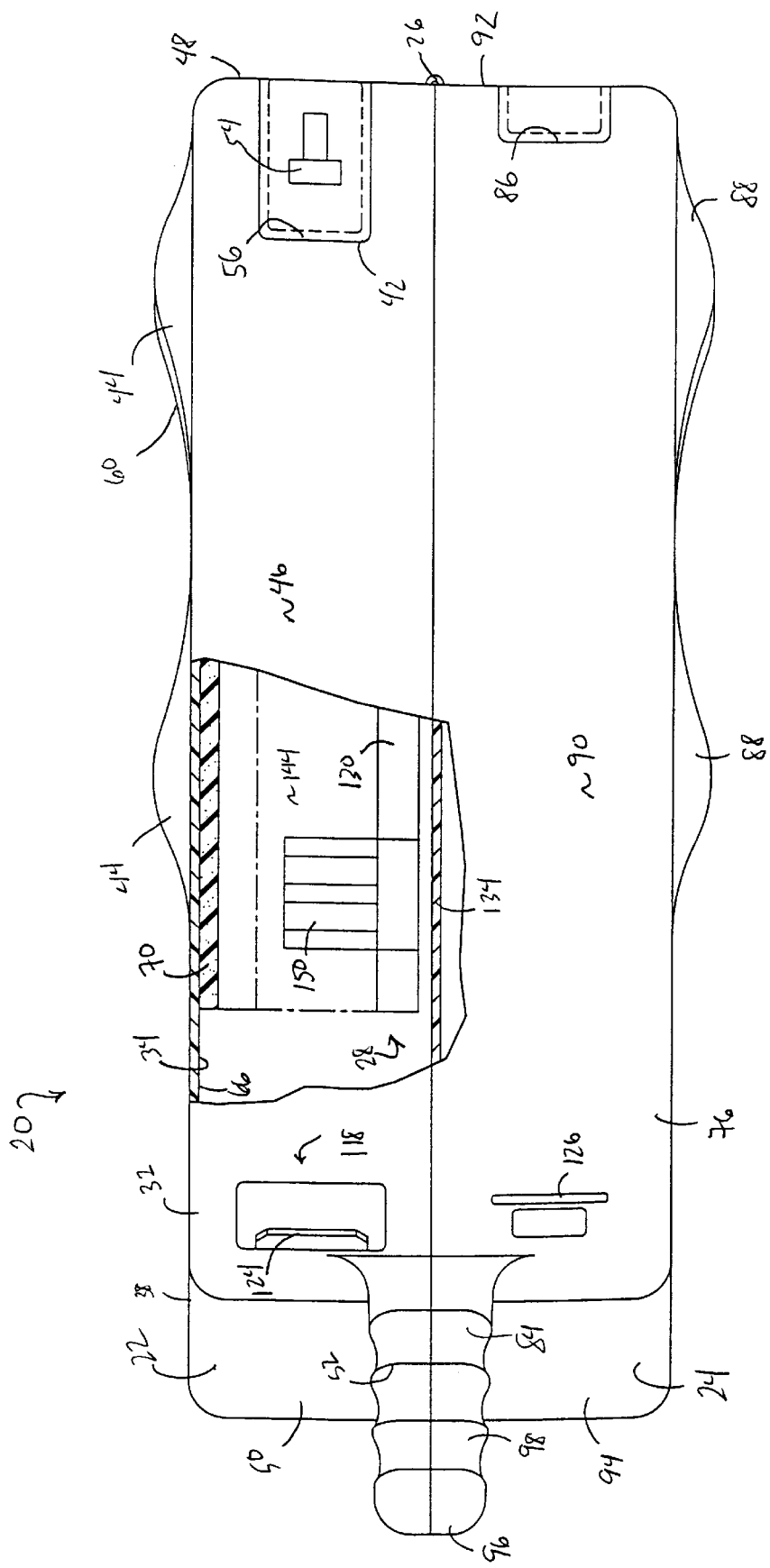
FIG. 2 is a side view of the laptop carrying case of FIG. 1 with a portion cut away for illustration.

As shown in FIGS. 2–4, the support members 44 are a pair of protuberant members that are sufficiently spaced from each other forming a trough 60 configured to receive the user's right leg therebetween. However, the support members 44 can also support the carrying case 20 on other surfaces such as a desk 62 as shown in FIG. 3.

Figure 5:
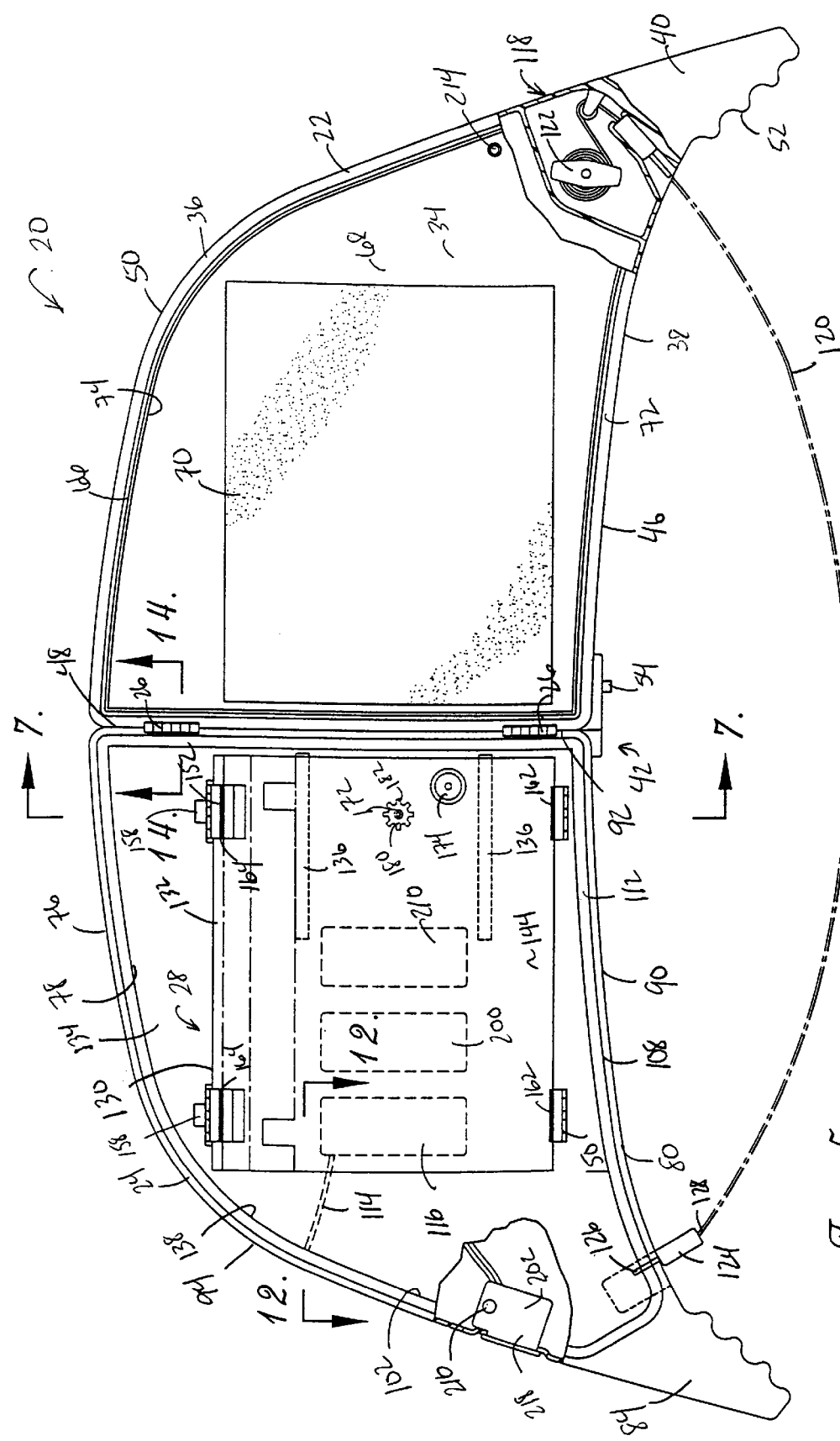
FIG. 5 is a top view of the laptop carrying case of FIG. 1 in the open position with the carriage in the carry position.
Figure 6:
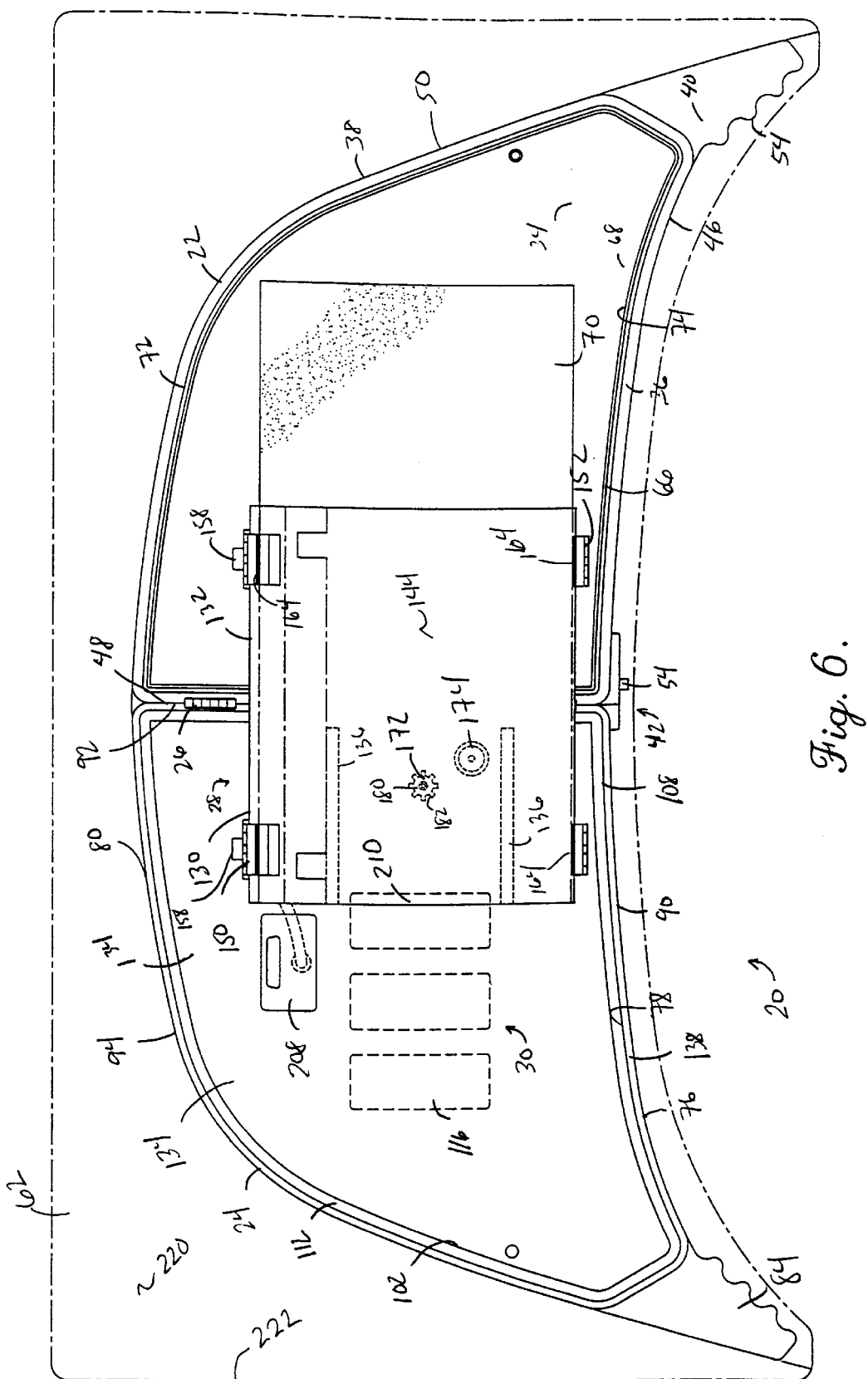
FIG. 6 is a top view of the laptop carrying case of FIG. 1 in the open position with the carriage in the work position.

As shown in FIGS. 5 and 6, the inner surface 34 includes a first side wall 64, a perimeter rib 66, a first floor 68, and a pad 70. The first side wall 64 includes a top edge 72, and a lower margin 74, and extends around the perimeter 36. The perimeter rib 66 is positioned along the top edge 72 of the first side wall 64. The first floor 68 is connected to the lower margin 74 of the first side wall 64. The pad 70 is attached to the first floor 68, preferably by an adhesive, although other methods of attachment could also be used. The pad 70 is generally centrally located on the first floor 68.

The second side 24 includes an outer surface 76, an inner surface 78, and a perimeter 80. The outer surface 76 includes a second outer wall 82, a second handle portion 84, a second slide bar receiving slot 86, and support members 88. The second outer wall 82 includes a back section 90, a base section 92, and a front section 94 subsequently identically configured to the corresponding sections of the first side 22. The second handle portion 84 is located at the junction of the front 94 and back 90 sections. The second handle portion 84 couples with the first handle portion 40 to form a handle 96 when the case 20 is in a closed position. The handle 96 has a grip 98 that is configured to generally fit a user's hand, although any type of handle which allows the user to tote the carrying case could be used. For instance, FIG. 15 illustrates a second embodiment of a handle 97. The second embodiment includes a hand receiving slot 99 configured to receive the user's hand allowing easy transportation. The upper and lower surfaces of the handle are curved to continue the ornamental shark fin look.

FIG. 9 shows the second slide bar receiving slot 86 formed in the back section 90 of the second outer wall 82. The second slide bar receiving slot 86 is located on the back section 90 near its junction with the base section 92.

FIGS. 2 through 4 show that the support members 88 for the second side 24 are similar to the first side 22 in that they are a pair of protuberant members and are sufficiently spaced from each other to receive the user's left leg therebetween. The support members 88 can also support the carrying case 20 on other surfaces such as a desk 62 as shown in FIG. 3. Preferably, the protuberant members for each side are integrally formed with the outer surfaces.

As shown in FIG. 5, the inner surface 78 includes a second side wall 102, a perimeter gasket assembly 104, and a second floor 106. The second side wall 102 extends around the perimeter 80 and includes a top edge 108, and a lower margin 110. The second floor 106 is connected to the lower margin 110 of the second side wall 102. The perimeter gasket assembly 104 includes a gasket 112, a connecting hose 114, and an air pump 116. As more clearly shown in FIGS. 12 and 13, the gasket 112 is positioned along the top edge 108 of the second side wall 102 and is configured to sealingly engage the first side wall 64 while the case 20 is in the closed position, thereby making the carrying case 20 watertight. FIG. 5 illustrates the air pump 116 is attached to the second floor 106 and is connected to the air pump gasket 112 by the connecting hose 114. The air pump 116 forces pressurized air through the connecting hose 114 into the gasket 112.

As shown in FIGS. 5 and 14, the hinge 26 is attached to the base sections 48, 92 of the outer walls of the first 22 and second sides 24. The first side 22 and second side 24 are pivotally connected by the hinge 26 and thus, are able to move between an open position and a closed position. Preferably, the hinge 26 includes a pair of stainless steel hinges attached by conventional fasteners such as rivets. However, any type of hinge or method of fastening known by those skilled in the art could be used.

As illustrated in FIG. 5, the case further includes a safety strap assembly 118. The safety strap assembly 118 includes a safety strap 120, a retracting mechanism 122, a clasp 124, and a clasp receiving opening 126. The safety strap assembly 118 is preferably located inside one of the handle portions 40, 84, with the strap 120 being mounted on the retracting mechanism 122. The clasp 124 is attached to an end 128 of the safety strap 120 and is configured to extend around the user's torso and be inserted into the clasp receiving opening 126 located on the other handle portion. The safety strap 120 prevents the carrying case 20 from falling off of the user's lap while in the open position. If the user carries the case 20 by placing the safety strap over his or her shoulder and allows the case to rest against his or her opposite side, opening the case automatically pulls the strap to a position around the user's torso. Alternatively, the strap is wrapped around the user's legs.

The carriage assembly 28 is shown in FIGS. 5–8 and 10–11. The carriage assembly 28 includes a carriage 130, a docking station 132, and a platform 134. The platform 134 includes a pair of tracks 136 and an outer rim 138. The outer rim 138 includes openings 140 through which fasteners 142 can attach the platform 134 to the top edge 108 of the second side wall 102. The fasteners 142 must be removable to allow access to the second floor 106 and are preferably set screws as shown in FIG. 14. FIGS. 5 and 6 illustrate the pair of tracks 136 that are located adjacent to the base section 92 of the outer wall 82 and extend perpendicularly outwards from the base section 92. The tracks 136 are generally about half the length of a laptop computer 144. Each track 136 includes an upper section 146 and a lower section 148 as shown in FIG. 7. The upper section 146 is circular in cross-section and is attached to the lower section 148. The lower section 148 is rectangular in cross-section and is attached to the platform 134. The pair of tracks 136 are generally parallel to each other.

FIGS. 7 and 8 show the carriage 130 in more detail. The carriage 130 includes a first clamp 150, an opposed second clamp 152, a docking station 154, and a pair of slotted track receiving channels 156. Each clamp includes a locking mechanism 158, a tightening bolt 160, a first gripping surface 162, and a second gripping surface 164. The first gripping surface 162 frictionally engages the docking station 154 and the second gripping surfaces 162 is configured to frictionally engage the laptop 144. The tightening bolt 160 allows the user to adjust the force applied by the first and second gripping surfaces 162, 164. When the locking mechanism 158 is engaged, the tightening bolt 160 is prevented from being adjusted. Preferably, the locking mechanism 158 is a lock and key arrangement, but other methods could also be employed.

The pair of track receiving channels 156 are configured to receive the upper sections 146 of the track 136. Each channel 156 is formed from a pair of generally downwardly extending members 166. The members each have an outer flat side 168 and an inner arcuate side 170. The inner arcuate sides 170 are spaced apart to receive the upper section 146 of the track member 136.

As shown in FIGS. 7, 10 and 11, the carriage assembly 28 further includes an actuator 172 and a solenoid 174. The actuator 172 and solenoid 174 are each attached to the platform 134. The actuator 172 includes a motor 176, a drive shaft 178, and a gear 180. The gear 180 is attached to the motor 176 by the drive shaft 178. The gear 180 includes teeth 182 which matingly engage the carriage 130. Specifically, the carriage 130 includes a rail 184 having holes 186 equally spaced from each other, and configured to engage the teeth 182 of the gear 180. The rail 184 is located on the underside of the carriage 130 and is substantially parallel to the track receiving channels 156.

The rail 184 further includes a pair of ends 188. A switch 190 is located at each end 188 of the rail 184 and, positioned to allow the gear 180 to engage when the carriage 130 reaches a carry position or a work position. The switches 190 are electrically connected to the solenoid 174 and when activated by the gear 180 contacting them, they send a signal to the solenoid 174 to lock the carriage 130 into the work or the carry position. The carriage 130 includes structure defining a hole 192 at each end 188. The solenoid 174 includes a pin 194 which is configured to engage the carriage 130 thereby locking it into place in either the work position or the carry position. The solenoid 174 inserts the pin 194 through the hole 192 to lock the carriage 130 thereby preventing it from moving. The switches 190 are also electrically connected to the actuator 172 signaling the motor 176 to turn off when contacted by the gear 180.

As shown in FIGS. 6 and 7, the docking station 132 is configured to retain the laptop 144 and to connect the laptop 144 with the accessories 30. The docking station 132 includes a docking wall 196 and a docking base 198. The docking base 198 is placed on the carriage 130 and retained by the clamps 150, 152. The laptop computer 144 is electrically connected to the docking wall 196 of the docking station 132. The docking station 132 can be configured to allow the carrying case 20 to operate with any laptop computer configuration.

As illustrated in FIGS. 5 and 6, the accessories 30 for the laptop carrying case 20 include a battery 200, a locking mechanism 202, a plurality of solar panels (not shown), an antenna (not shown), and a global positioning system 208. The battery 200 is attached to the second floor 106 and is electrically connected to the docking station 132 solenoid 174, actuator 172, and air pump 116. All electronics are preferably operated by power from the battery 200. A backup battery 210 can also be included. The second battery 210 is also attached to the second floor 106.

The locking mechanism 202 preferably includes an electronic lock that is opened using a fingerprint sensing device 212. The lock includes a bolt 214, a bolt receiving opening 216 and a sensor (not shown) connected to an electronic mechanism 218 to operate the bolt 214. The bolt 214 is attached to one side of the case 24 and a bolt 214 receiving opening and lock 202 located opposite the bolt 214 on the other side 22. The lock 202 is operable to recognize the thumb print of the user and will prevent any unauthorized person from placing the case 20 into its open position. However, any locking mechanism 202 could be used, for instance, a combination lock could also be used to prevent entry into the carrying case 20.

The case 20 also includes a plurality of solar panels (not shown). These are preferably attached to the inside of the case 20 and configured to "pop up" when the case 20 is in the open position and the carriage 130 is locked into the work position. The solar panels (not shown) are electrically connected to the battery 200 and are configured to charge the battery 200 or assist the battery 200 in providing the laptop 144 with power.

The antenna (not shown) is preferably a plurality of wires located along the perimeter 80 of the second side 24. The antenna (not shown) is electrically connected with the docking station 132 and is configured to handle all wireless transmissions from fax and modem technology. By using the perimeter 80 of the case 20 as the antenna (not shown), the reception can be greatly improved.

Further, a global positioning system 208 or GPS may be included in the case 20. This will allow the owner of the case 20 to know the exact location of the carrying case at all times. The GPS 208 system is configured to be electronically connected to the battery 200 and the antenna (not shown). The GPS unit 208 is preferably attached to the second floor 106, although it could be located in any position within the case 20, such as the recesses created by the support members 44.

In operation, the user can transport the laptop computer 144 by carrying the case 20 by the handle 96 or by using the safety strap 120. The safety strap 120 can be worn over either shoulder of the user with the case 20 resting against the user's side. The carrying case 20 is in the closed position while the case is in transport. To place the case 20 in the open position, the user needs to disengage the locking mechanism 202. In order to do this, the user places his thumb on the sensor (not shown). The locking mechanism 202 will recognize the user's thumb print and disengage the locking mechanism 202. The user can then open the laptop carrying case 20. Once the case has been placed in the open position, the user can move the slide bar 54 from its first slide bar receiving slot 56 to engage the second slide bar receiving slot 86. The laptop computer 144 and carriage 130 are in the carry position, but once the slide lock bar 54 is placed in the second slide bar receiving slot 86, the actuator 172 receives a signal to automatically move the carriage 130 into the work position. The actuator 172 rotates the gear 180 which engages the rail 184, sliding the carriage 130 from a position substantially central to and proximal to the second side 24, to a position generally centered about the case hinge 26 and substantially centered with respect to both sides of the case. The gear 180 engages one of the switches 190 which signals the actuator 172 to stop and the solenoid 174 to insert the locking pin 194 into the opening 192 thereby locking the carriage 130 into the work position.

From the work position, the user can place the support members 44, 88 on his or her lap, extend the safety strap 120, place it around his or her torso and then insert it into the clasp receiving opening 126. The case 20 is configured to surround the user. The handle portions 40, 84 are located on either side of the user and the laptop 144 is located at a comfortable distance in front of the user. Now the user can operate the laptop computer 144 as easily as if there were a desk in front of him or her because the case also provides a work area around the case. The screen 145 of the laptop computer pivots relative to the computer body 147 about a screen axis substantially perpendicular to the case axis defined by the hinges 26 of the case 20.

In order to prepare the case 20 for transport the user releases the clasp 124 and allow the safety support strap 120 to recoil. Next, the slide bar 54 is slid back into the first slide bar receiving slot 56. To return the entire computer 144 to the carry position within the extremities of one of the sides, the solenoid 174 is signaled to remove the locking pin 194, then the actuator 172 is signaled to slide the carriage 130 back to the carry position. The solenoid 174 is again signaled to insert the locking pin 194 to lock the carriage 130 in its carry position. The user can then place the sides 22, 24 into the closed position and engage the locking mechanism 202.

When the user is not traveling, the carrying case 20 can be placed into the desk 62. Desk 62 includes a recessed surface 220, which defines a recess 224 similarly configured to the case in its open position and into which the case 20 can be received. The recess is defined by interior sidewalls 222 that are configured to be similar in height to the carrying case 20 in the open position when the support members are resting on the recessed surface 220. The desk also preferably includes connectors (not shown) for operative connection with the components of the laptop 144 and case 20.

Those skilled in the art will now appreciate the benefits of the present invention. For example, the user will be able to use their laptop in airports and airplanes as easily as if they had a desk in front of them. The case automatically moves the laptop into position, thus no setup is required in order to begin working. The docking station and extra batteries allow the user to increase the amount of time the computer can be used without recharging.

Those skilled in the art will also appreciate that the present invention encompasses many variations in the preferred embodiments described herein. The preferred embodiment includes an actuator to move the carriage from the carry position to the work position. This can be accomplished by sliding the case by hand from the two positions. The case includes a watertight gasket operated by an air pump, but this could also be accomplished by a seal with tight tolerances. The invention includes support members, but the case could be constructed without them. Also, the first side includes a pad located on the first floor, but the side could have foam which is configured to fit snugly around the laptop to further protect it. All electronics are preferably operated by a battery 200, but the case could also be powered by wind-up technology (not shown). This would allow the laptop 144 to use a spring under tension as a power source rather than needing to recharged the battery 200 at certain intervals.

Having thus described the preferred embodiments of the present invention, the following is claimed as new and desired to be secured by Letters Patent:

What is claimed is:

1. A carrying case for holding a laptop computer, the carrying case being foldable between a closed position and an open position, the case comprising:
   at least two sides connected to each other;
   a carriage assembly for retaining the laptop computer, the carriage assembly connected to at least one side, and said carriage assembly being movable, while the case is in the open position, between a carry position substantially central to at least one side of the sides for closing the case and a work position substantially central to the two sides; and
   said carriage assembly includes a slide track attached to the at least one side for sliding the carriage assembly between the carry position and the work position.

2. The carrying case of claim 1, further comprising a strap configured to secure the case to a user.

3. The carrying case of claim 1, further including a locking mechanism operably joined with the two sides.

4. The carrying case of claim 1, further comprising a hinge connecting said sides.

5. A carrying case in combination with a laptop computer having a body, the carrying case comprising:
   a carrying case which can be folded between open and closed positions;
   said carrying case including a pair of sides and a carriage assembly;
   said sides enclosing the laptop computer in the closed position;
   said carriage assembly retaining the laptop computer body and configured to move substantially the entire laptop computer from a carry position substantially within extremities of at least one of the sides to a central work position while the case is in the open position; and
   said carriage assembly includes a carriage and at least one track, said carriage assembly also including at least one track receiving channel to slide the laptop computer between the carry position and the work position, a selected one of the at least one track and the at least one track receiving channel being attached to the at least one side, and another of the at least one track and the at least one track receiving channel being attached to the carriage.

6. The combination of claim 5, wherein each of said sides includes a perimeter, one of said sides includes a perimeter rib, the other of said sides includes a gasket extending around the perimeter, the perimeter rib and said gasket are configured to sealingly engage thereby producing a waterproof seal.

7. The combination of claim 5, wherein said case includes an electronic locking mechanism.

8. The combination of claim 5, wherein said carriage assembly includes at least one clamp configured to retain the laptop body.

9. A carrying case which can be folded between a closed position for transporting a laptop computer and an open position for holding the laptop computer having a computer body and a computer screen for a person to operate, the case comprising:
   a first side;
   a second side;
   a case hinge connecting the first side to the second side for pivoting the first side relative to the second side about a case hinge axis;
   a carriage assembly for retaining the laptop computer, said carriage assembly connected to at least one side and including a carry position and a work position, said carry position, while the case is in the open position, being defined by positioning the laptop computer proximal to only one side, said work position, while the case is in the open position, being defined by positioning the laptop computer generally centered about the hinge, said carriage assembly configured to move the laptop computer between the carry position and the work position while the case is in the open position, and the computer screen pivoting relative to the computer body about a screen axis substantially perpendicular to the hinge axis;
   said carriage assembly includes at least one clamp; and
   the at least one clamp includes a lock which prevents the at least one clamp from being adjusted.

10. The carrying case of claim 9, wherein said carriage assembly includes a docking station.

11. The carrying case of claim 9, wherein said carriage assembly further includes a solenoid configured to lock the carriage in the work position.

12. The carrying case of claim 9, further including a handle.

13. The carrying case of claim 12, wherein each side includes a convexly curved front section and a concavely curved back section, said handle is located at the junction of the front section and the back section.

14. The carrying case of claim 9, wherein each side, while the case is in the open position, is configured to wrap around a user.

15. The carrying case of claim 9, wherein said two sides include a slide lock configured to maintain the sides in the work position.

16. A carrying case for holding a laptop computer, the carrying case being foldable between a closed position and an open position, the case comprising:
   at least two sides connected to each other;
   a carriage assembly for retaining the laptop computer the carriage assembly connected to at least one side, and said carriage assembly being movable, while the case is in the open position, between a carry position for closing the case and a work position; and
   said carriage assembly including a slide track attached to the at least one side for sliding the carriage assembly between the carry position and the work position.

17. A carrying case which can be folded between a closed position for transporting a laptop computer and an open position for holding the laptop computer having a computer body and a computer screen for a person to operate, the case comprising:

a first side;

a second side;

a case hinge connecting the first side to the second side for pivoting the first side relative to the second side about a case hinge axis;

a carriage assembly for retaining the laptop computer, said carriage assembly connected to at least one side and including a carry position and a work position, said carry position, while the case is in the open position, being defined by positioning the laptop computer proximal to only one side, said work position, while the case is in the open position, being defined by positioning the laptop computer generally centered about the hinge, said carriage assembly configured to move the laptop computer between the carry position and the work position while the case is in the open position, and the computer screen pivoting relative to the computer body about a screen axis substantially perpendicular to the hinge axis; and each side includes a perimeter and one side includes an inflatable gasket which surrounds the perimeter thereby producing a waterproof seal.

\* \* \* \* \*